3,381,801
FLEXIBLE CONVEYOR
Blaise Rastoin, 40 Ave. de la Panouse le Cabot,
13 Marseille, France
Continuation-in-part of application Ser. No. 529,407,
Feb. 23, 1966. This application Sept. 28, 1967, Ser.
No. 671,463
Claims priority, application France, May 20, 1965, 21,010,
Patent 1,436,336; Jan. 5, 1966, 21,260, Patent 89,381
(addition)
7 Claims. (Cl. 198—213)

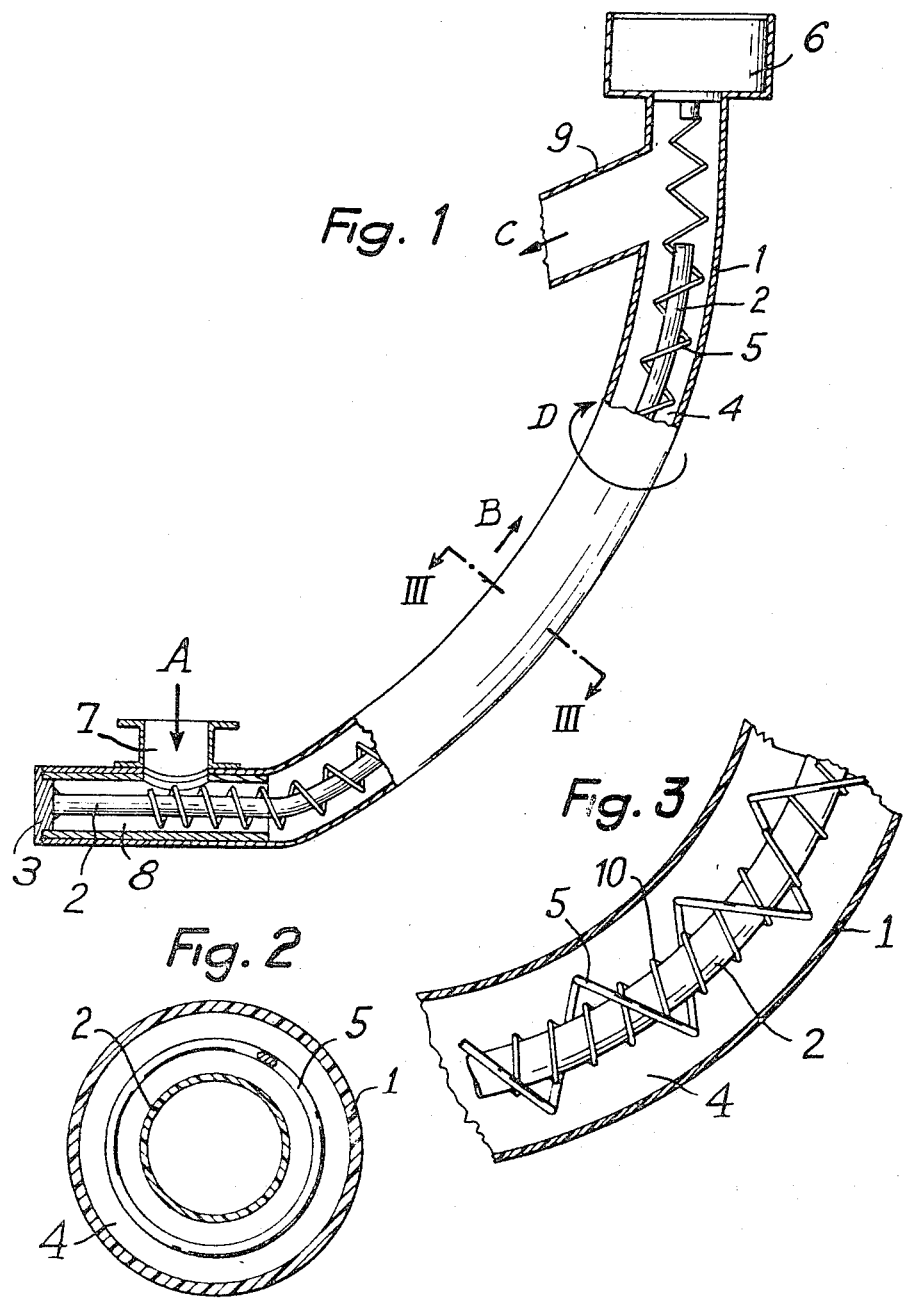

ABSTRACT OF THE DISCLOSURE

A conveyor for transporting material comprising a flexible tube open at its ends and a flexible core disposed axially within the tube so as to define with the tube a longitudinal flow path of annular cross section. A spiral feed member disposed coaxially in the annular spacing between the core and the tube and means for rotating the spiral member with respect to the tube to feed material from an inlet formed in one end of the flexible tube towards an outlet formed at the other end thereof.

---

This is a continuation-in-part of applicant's application Ser. No. 529,407, filed Feb. 23, 1966, now abandoned.

This invention relates to conveying devices for conveying pulverized, granular or fluid materials and more particularly to a flexible conveyor tube having a spiral feeding member guided by a flexible core held within the conveyor tube.

Conveying systems are known wherein one or more flexible helical elements are encased in a flexible tubing. In the case where only one helical element is used it may take the shape of an endless screw or a plurality of endless screws attached to a flexible longitudinal element. In the endless screw wherein no flexible longitudinal core or element is provided a central void or empty space is formed when the screw is rotated. The material to be transported has a tendency to fall into this empty space and return to the inlet therefore requiring the endless screw to continuously carry the same material. If a thin spiral member is substituted for the endless screw this central core becomes larger and the effectiveness of the conveyor is reduced.

In a system where the endless screws are attached to a flexible longitudinal element the problem of the hollow central void is eliminated but if the conveying tube is filled with the material being transported and is for some reason stopped, restarting of this type of a conveyor becomes a problem due to the construction of the endless screws and the space they occupy in the tube. In the further case where these above set forth disadvantages are overcome by providing at least two continuous wire-like or spiral elements in the general form of coaxially internested helices extending through a flexible tube, the individual helices are rotated in different directions thus requiring a driving motor and gearing arrangement for each separate helix. In a large conveying system where large quantities of material are to be transported the extra expense of additional motors and driving connections would be warranted, but in a small installation, i.e., one that could be operated by a single person, the added expense plus the maintenance of the additional equipment would be an added burden.

In a conveying system containing a plurality of internested helices the helices are left free to rotate and require no additional means of support other than occasional points or areas of contact between the helices and between the outermost helix and the casing wall. But, this type of a system is only effective when the helices are rotated at high speeds and for large flow rates. There therefore exists a need for a conveyor which is effective at lower speeds and for small or intermediate flow rates.

In order to meet this existing need applicant's present invention provides a central, flexible support concentric within a flexible tube to reduce the axial volume of the pulverous substances to be transported and which constitutes a centering and positioning support for a single helical spiral which is separate from and rotates about the flexible support. A conveyor of this type is effective for delivering small or intermediate flows with a low speed motor and by increasing the speed of the motor is able to effectively vary the rate of delivery of the material or fluid substance.

An object of this invention is to provide a device for the purpose of conveying pulverulent, granular or fluid products, for distribution by means of a flexible conduit which can be adjusted in all directions.

A further object of this invention is to provide a device for conveying materials which device contains a flexible driving member guided by an independent flexible core.

The invention is characterized by the provision, in the axis of a flexible external casing with a smooth internal wall, of a concentric cylindrical element in such a manner as to leave an intermediate annular space in which a helicoidal body performs a rotatory movement which transports the pulverulent, granular or fluid substance, it being pointed out that the spiral is positioned, in its rotation, by its separate axial support, enabling the mechanical transport of an evenly distributed substance to be accompanied by a pneumatic turbulence by which the substance is fluidized and its delivery accelerated.

In the accompanying drawings, preferred embodiments of the invention are illustrated, without any limitative effect:

FIG. 1 shows one embodiment of the conveying system;

FIG. 2 is a cross section taken along line II—II of FIG. 1;

FIG. 3 shows a reinforced tubular element, in section;

Figure 4:
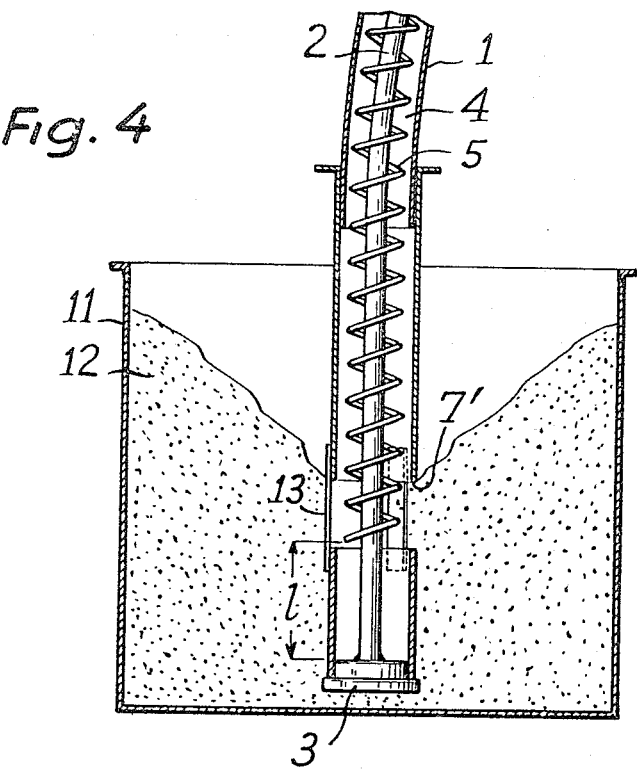
FIG. 4 shows in another embodiment of the invention the loading end of a conveyor of this invention placed in a grain hopper in an upright position.

Referring now to FIG. 1, the device consists of a tubular flexible casing 1, with a smooth internal wall, in the axis of which casing a solid or tubular bar 2 having a smooth external perimeter is positioned concentrically when in operation, the bar being likewise flexible, but affixed against rotation by at least one end in an end plug 3. The tubular bar 2 may be made integral with the end plug 3 or merely fixed against rotation therein.

The intermediate space 4 formed between the casing 1 and bar 2 contains a spiral or spring 5, in the form of a thin wire-like element which is connected to a motor 6 for rotation thereof.

The spring 5 is highly flexible and may be of a length adequate to extend to the plug 3 or its free end may terminate at the inlet 7. Upon rotation of the spring by motor 6 the spring is capable of extending so as to fill the space between its terminal end in the rest position and the plug member 3 (as shown in dotted line in FIG. 5).

The lower extremity of the casing 1 includes a portion 8 which is open, which is fed through the inlet 7, and may be in any desired form, with the material to be raised or transported, while the upper part is fitted with an outlet 9.

The flexible casing 1, FIG. 3, contains the tubular or solid concentric element 2. This concentric element is equipped with the spiral spring or helicoidal body 10, which is concentric with the spiral 5, identical to that shown in FIGS. 1 and 2.

The advantages and the operations of this device will thus be evident.

The pulverulent, granular or even fluid material to be conveyed is fed through the inlet 7, in the direction shown by the arrow A, to the flexible casing 1.

Through the portion 8 the product is then caused to enter into the annular space 4 formed by the internal wall of the casing 1 and the spiral element 5.

In this space the spiral spring 5, driven by the motor 6, performs a rotatory movement as shown by the arrow D, resulting not only in a mechanical reaction on the product, in the direction shown by the arrow B, but also in an eddying movement of which the effect is both pneumatic and emulsifying.

The substance is thus "fluidized" and rendered transportable, despite the effects of static electricity or of surface tension, the interference phenomena caused by these latter being nullified.

This result is due in particular to the provision of the concentric element 2, which reduces the axial volume of the pulverous substance and subjects it, within a small space, to the action of the spiral spring 5, causing it to move in the direction shown by the arrow B. It also constitutes a centering and positioning support which prevents the spiral undergoing deformations, limits the amplitude of its transversal movements and also imparts to it a guided rotatory movement which is homogeneous over its entire length, thus ensuring an even rate of delivery.

All the vibrations in the spiral are thus eliminated, as are likewise other causes of breakage due to excessive vibration.

The product then emerges through the outlet 9, in the direction shown by the arrow C. The ascending and descending movements are rendered possible and the substance can be transported in all vertical and horizontal planes and at variable angles of obliquity.

The spiral 10, FIG. 3, prevents the spiral 5 from suffering wear by coming in contact with the concentric element 2, and also further prevents the driving spiral 5 from undergoing deformation, while at the same time limiting the amplitude of its transversal movements.

In addition, the spiral 10 forms a slight projection which, in the direction of thrust, facilitates the advance of the pulverous substance, checks its backward movement and positions it to enable it to be taken up by the spiral 5, the current thus being emulsified in a continuous manner.

FIG. 4 shows a conveyor made in accordance with this invention inserted into a grain hopper 11 containing the material 12 to be conveyed. In this position the end plug 3 of casing 1 is pushed as far as possible into the material 12 so as to completely immerse the inlet 7' in the material. As shown, the inlet 7' in this embodiment is completely open over an area of 360° and the two sections of the tubing 1 are held together in spaced relation by means of a plurality of connectors 13. This arrangement provides a circumferential mouth or inlet 7' which allows material to be fed into the conveyor from all sides therefore allowing a uniform flow of material to be established.

Figure 5:
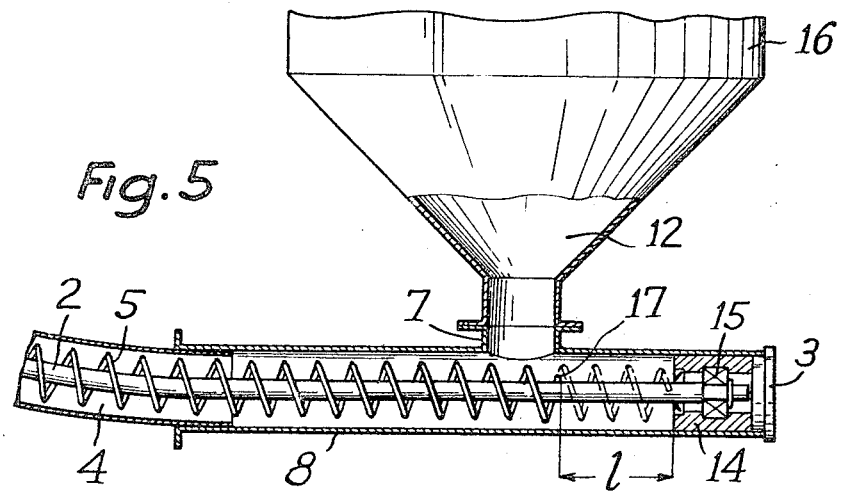
FIG. 5 shows the loading end of a conveyor of a further embodiment of this invention in a horizontal position.

Referring now to FIG. 5, a still further embodiment of the conveyor of this invention is shown. In this embodiment one end of the flexible concentric element 2 is held within a bearing means 14 which allows the element 2 to be rotated on ball bearing 15. There is no driving means for the element 2 and this element is not connected to the end plug 3, but is allowed to rotate by action of the moving material being conveyed by the spiral 5. A hopper 16 is provided above the inlet 7 and the material 12 is fed by means of gravity or pneumatic pressure into the portion 8.

The spiral 5 (shown in FIGS. 4 and 5) is in the rest position with its terminal end 17 adjacent to the inlet 7'. Upon rotation of the spiral 5, by the motor 6, the spiral is caused to extend (as shown in dotted lines) the distance 1, thus enabling any material trapped in the end of position 8 to be conveyed to the outlet 9 (shown in FIG. 1). This extending of the spiral 5, further aids the conveying of the material through space 4 since upon changing the speed of the rotation of the spiral, the spiral is caused to expand or to contract which action enables materials of different consistencies to be more readily adapted for conveyance.

The flexibility of all the elements enables irregular paths to be followed by the substance in this conveyor which can be installed with equal ease in a fixed position or on vehicles or mobile chassis.

It can be applied equally well to the transport of pulverous products and to that of granular or fluid products, and can also be used for distributing systems of all kinds.

The cross section of the driving spiral can occupy almost the whole of the annular space 4 or only a part of this latter, according to the purpose for which it is to be used. It may also be of the multi-wire type or have a progressively increasing pitch in the direction B.

The shapes, dimensions and arrangements adopted for the various elements may thus vary, within the limits allowed by equivalent devices as may also the materials used for their manufacture, without thereby departing from the general principle of the invention described in the foregoing.

The invention may be summarized as a flexible conveying device, characterized as follows:

(1) A fixed flexible tubular external casing, with a smooth internal wall;

(2) A flexible internal element, positioned concentrically by its operation, of cylindrical cross section and with a smooth external wall, affixed by at least one end but in some applications capable of rotating freely;

(3) A fixed metallic spiral body surrounding the concentric cylindrical non-driving element to prevent contact with the driving spiral and the consequent wear on the latter, and limiting the amplitude of its transversal movements;

(4) A slight projection formed by the spiral surrounding the axial cylindrical fitting, facilitating the advance of the substance, preventing it from moving back, and positioning it for the action of the driving spiral;

(5) The combination of the flexible external casing and the concentric element which is automatically centered axially, providing an annular intermediate space over the entire length of the conduit;

(6) The provision, in the annular space thus obtained, of a spiral or spring with a helicoidal pitch and of the single path or of multi-path type, operated by a motor which causes it to move at a high speed;

(7) A driving spring or driving spiral, positioned by the axial fitting, preventing possible deformations and limiting the amplitude of the lateral movements and thus ensuring perfect regularity in the rotation of the helicoidal body, eliminating interference vibrations and causes of breakage;

(8) The provision of a flexible driving spring or spiral which is capable of extending when rotated, which extension may be controlled by the speed of rotation of the spiral, the spacing provided between the end of the spiral in the rest position and an end plug placed in the conveying tube, or a combination of the two.

(9) An annular space by which the conduit is "calibrated" ensuring homogeneous distribution of the pulverous, granular or fluid product transported;

(10) The homogeneous distribution of the product transported, ensuring not only a mechanical conveying operation but also a pneumatic eddying action by which the current is fluidized and its flow facilitated, the product being at the same time prevented from forming accumulations or from falling back again;

(11) Strength and durability ensured in the spiral or helicoidal pitch by the concentric element.

What we claim is:

1. A conveying device, for pulverulent, granular and fluid substances, comprising a flexible tube open at its ends, means defining an inlet opening in said tube adjacent one end thereof, a flexible core disposed axially within the flexible tube at a spacing from the internal wall of the tube so as to define therewith a longitudinal flow path of annular cross section, a spiral member disposed coaxially in the annular spacing between the core and the tube, and means for rotating said spiral member with respect to the tube and the flexible core to feed said substance toward means defining an outlet in said tube.

2. A conveying device, as claimed in claim 1, further including a coaxial spiral body carried by and offstanding from the core.

3. A conveying device as claimed in claim 1 comprising means sealing at least one end of said tube and fixing said core by at least one of its ends, which means prevents said core from rotating and from moving axially with respect to said tube.

4. A device according to claim 1 in which said spiral member is a driven flexible spring of thread-like elastic material.

5. A device according to claim 1 wherein said flexible core is rotatably mounted in means located at one end of said tube.

6. A device according to claim 1, in which a space is formed between an end of the spiral at rest and means sealing one end of the tube, said space being filled by an extension of said spiral when said spiral is rotated.

7. A device according to claim 1 wherein said flexible tube is composed of two sections joined together by connecting means so as to form therebetween a circumferential inlet.

References Cited

UNITED STATES PATENTS 2,954,261   9/1960   Taupin _____ 198—213

RICHARD E. AEGERTER, *Primary Examiner.*